United States Patent
Hjelm

[15] 3,652,121
[45] Mar. 28, 1972

[54] PICKUP TRUCK BOX MOUNTED CAB

[72] Inventor: Erik V. Hjelm, Box 42, Westby, Mont. 59275

[22] Filed: July 24, 1970

[21] Appl. No.: 58,084

[52] U.S. Cl. ................................................296/26, 296/99
[51] Int. Cl. .........................................................B62d 33/00
[58] Field of Search...................296/10, 23 MC, 26, 99, 23

[56] References Cited

UNITED STATES PATENTS

| | | | |
|---|---|---|---|
| D187,068 | 1/1960 | Marx | 296/23 MC |
| 3,169,792 | 2/1965 | Viquez | 296/99 |
| 2,559,029 | 7/1951 | Randolph | 296/23 MC |

Primary Examiner—Philip Goodman
Attorney—Clarence A. O'Brien and Harvey B. Jacobson

[57] ABSTRACT

An enclosure for mounting in the forward end of the load bed of a pickup truck. The enclosures includes front, rear and opposite side walls and the rear corners of the enclosure include rearwardly, downwardly and outwardly opening opposite side recesses for receiving those portions of the rear wheel wells of the associated pickup truck which project inwardly of the side walls of the load bed. The front wall of the enclosure includes an openable window assembly for close registry with the rear window of the cab of the associated pickup truck and the length of the enclosure is such that it will, when disposed in a pickup truck load bed, occupy only the front half of the pickup truck load bed, thereby leaving the rear portion of the pickup truck load bed free to receive various loads therein.

8 Claims, 4 Drawing Figures

PATENTED MAR 28 1972 3,652,121

Erik V. Hjelm
INVENTOR.

BY Clarence A. O'Brien
and Harvey B. Jacobson
Attorneys

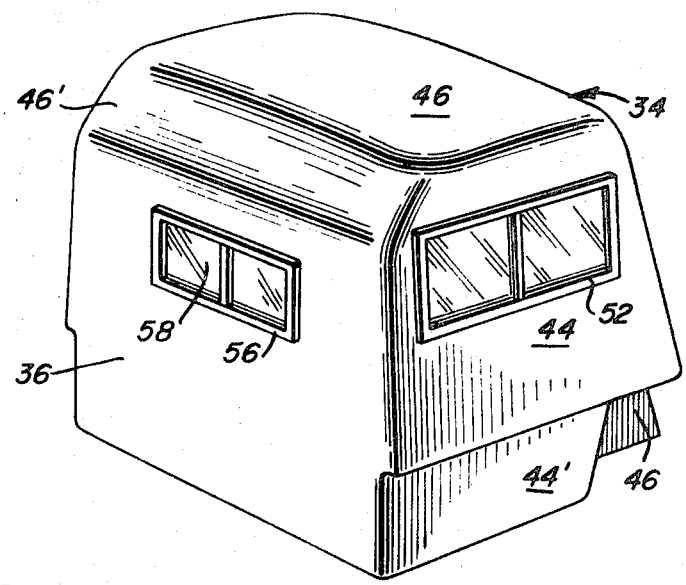
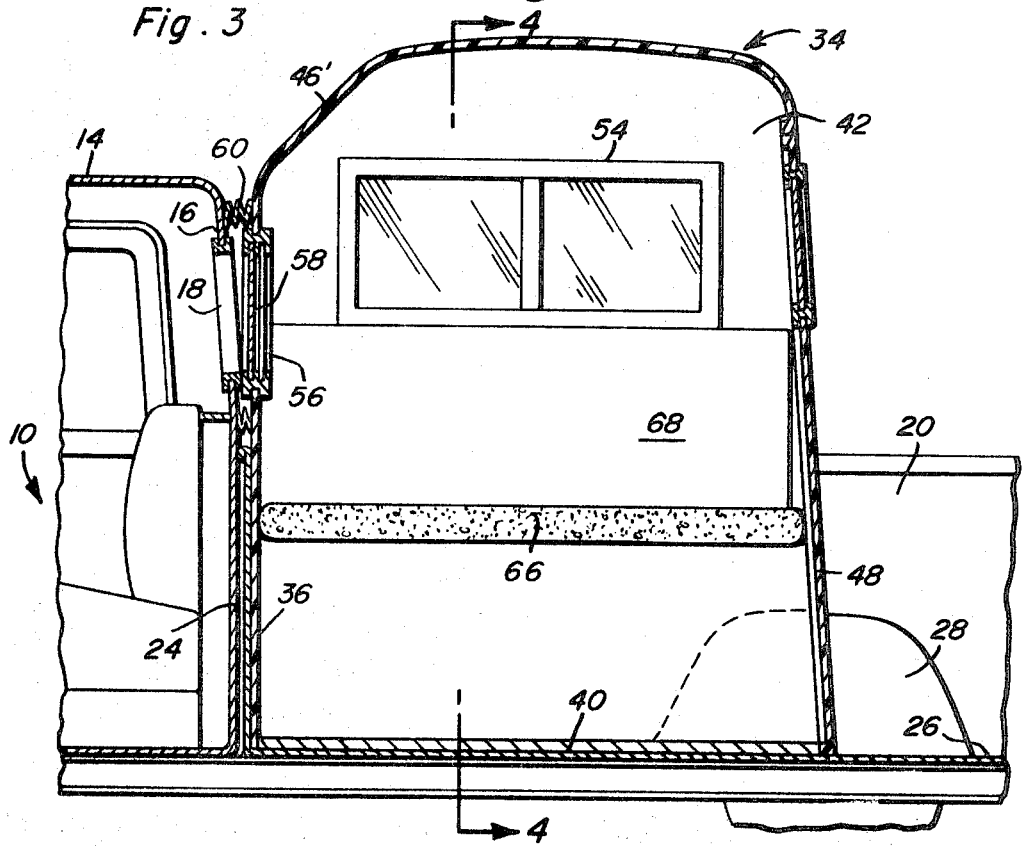

PICKUP TRUCK BOX MOUNTED CAB

The load bed mounted personnel cab of the instant invention has been designed to provide an enclosure which may be readily mounted in and removed from a conventional pickup truck load bed. The cab has further been designed for mounting in the forward end of a pickup truck load bed in a manner leaving the rear end of the pickup truck load bed free to receive various loads therein. The cab is also constructed in a manner whereby modification of the rear cab window of a pickup truck on which the personnel cab is to be mounted will enable persons within the load bed mounted personnel mounted cab to communicate with persons disposed in the pickup truck cab.

The main object of this invention is to provide a readily mountable and removable pickup truck load bed personnel enclosure for disposition in the forward end of an associated pickup truck load bed.

Another object of this invention, in accordance with the immediately preceding object, is to provide a pickup truck load bed personnel carrying enclosure for disposition in the forward end of an associated load bed and including rearward, downwardly and outwardly opening recesses formed in its rear corner portions for receiving those portions of the rear wheel well of an associated pickup truck which project inwardly of the side walls of the pickup truck load bed.

Still another object of this invention is to provide an enclosure in accordance with the preceding objects and including an openable front window assembly for close registry with the rear window of the associated pickup truck cab.

A final object of this invention to be specifically enumerated herein is to provide an enclosure in accordance with the preceding objects and which will conform to conventional forms of manufacture, be of simple construction and easy to install so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 2 is a perspective view of the enclosure;

FIG. 3 is an enlarged fragmentary longitudinal vertical sectional view taken substantially upon the plane passing through the longitudinal center line of the assembly illustrated in FIG. 1.

Figure 1:
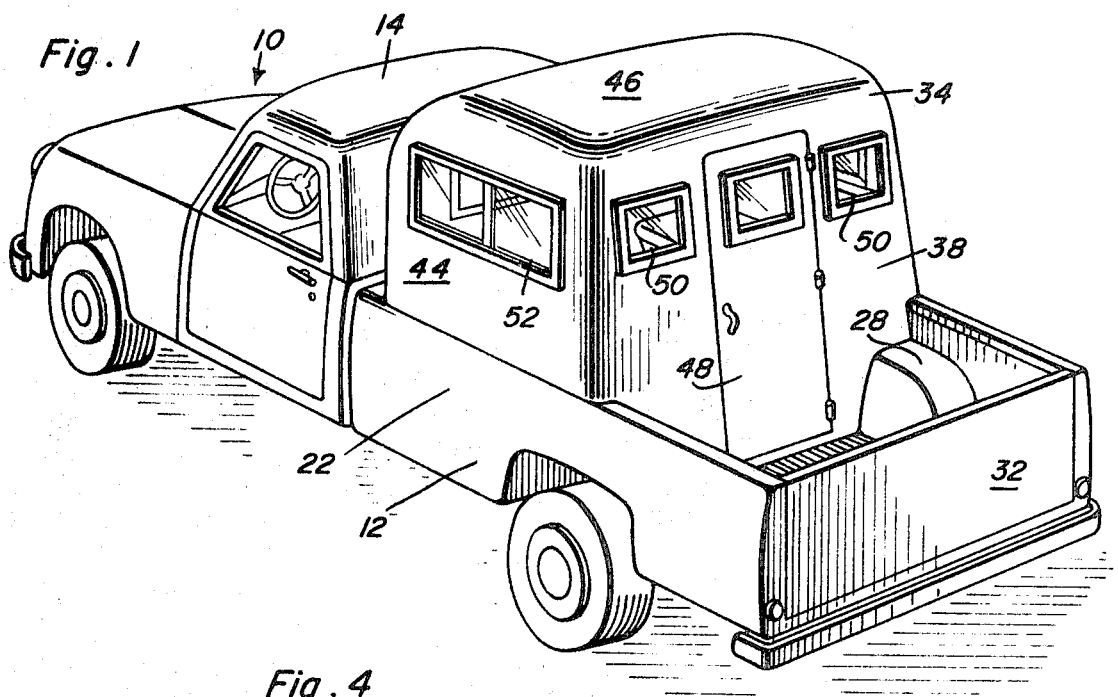
FIG. 1 is a perspective view of a conventional form of pickup truck with the enclosure of the instant invention mounted in the forward portion of the pickup truck load bed.

Referring now more specifically to the drawings the numeral 10 generally designates a conventional form of pickup truck including a load bed 12 and a cab portion 14 including a rear wall 16 in which a window opening 18 is defined.

The load bed 12 includes opposite side walls 20 and 22, a front wall 24, a bottom wall 26 and a pair of opposite side wheel wells 28 and 30 as well as a rear pivoted tailgate 32.

The enclosure of the instant invention is referred to in general by the reference numeral 34 and includes front and rear walls 36 and 38 interconnected by means of a bottom wall 40 and opposite side walls 42 and 44. A top wall 46 is formed integrally with the upper marginal edge portions of the walls 36, 38, 42 and 44 and the top wall 46 includes a forwardly and downwardly inclined forward portion 46'.

The enclosure 34 may therefore be seen to define a generally rectangular hollow housing of somewhat greater height and width than length and the rear wall 38 includes a generally horizontally swingable door 48 as well as opposite side windows 50 while the opposite side walls 42 and 44 include side windows 52 and 54, respectively, and the front wall 36 includes a window assembly 56 provided with at least one sliding glass panel 58.

Figure 4:
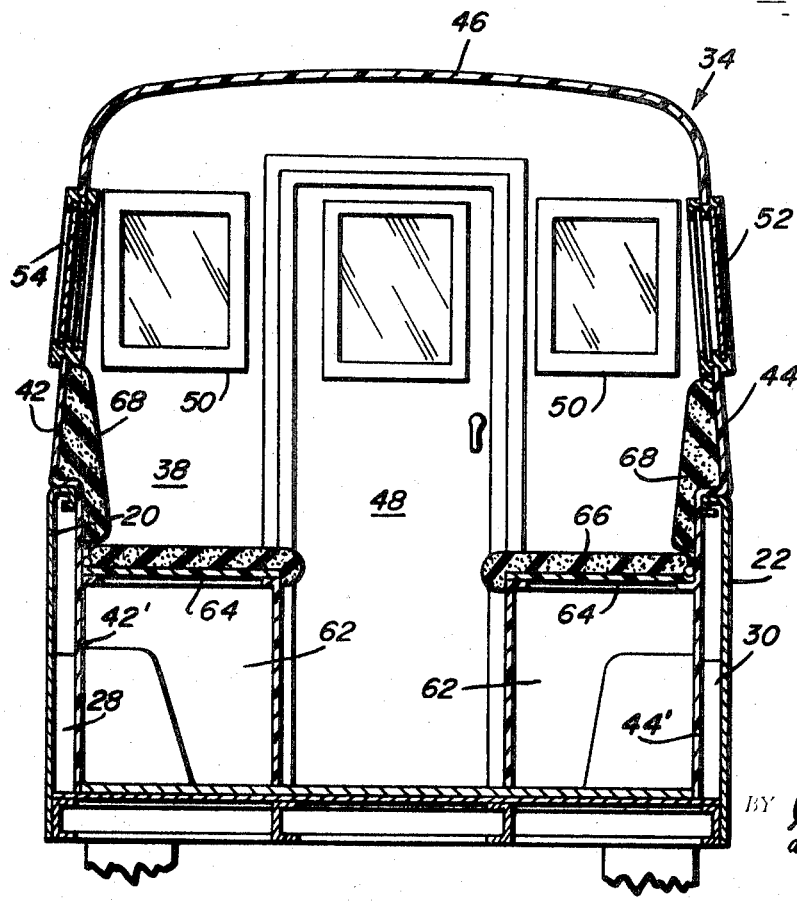
FIG. 4 is a transverse vertical sectional view taken substantially upon a plane indicated by the section line 4—4 of FIG. 3.

It may also be seen from FIGS. 1 and 2 of the drawings that the side walls 42 and 44 include slightly inwardly offset lower end portions 42' and 44' in order that the lower portion of the enclosure 34 may be snugly received between the side walls 20 and 22 of the load bed 12 and the upper portions of the side walls 42 and 44 may rest upon and be at least partially supported from the upper marginal edges of the load bed side walls 20 and 22. Further, the lower portion of the enclosure 34 includes rearwardly, downwardly and outwardly opening recesses 46 in its lower rear corner portions in which the wheel wells 28 and 30 are snugly received when the enclosure 34 is disposed in the load bed 12 as illustrated in FIGS. 1, 3 and 4.

The window 56 is closely registered with the window opening 18 and the latter may be devoid of a window pane whereby voice communication may be maintained between persons disposed within the cab portion and persons within the enclosure 34 when the glass pane 58 is moved to the open position. Also, a protective boot 60 extends between and sealingly connects the window assembly 56 and the opening 18.

The top wall 46 projects approximately 16 inches above the top of the cab portion 14 and the forwardly and downwardly inclined forward portion 46' of the top wall 46 reduces wind resistance on the enclosure 34 as the truck 10 is moving forwardly.

The rear wall 38 is slightly forwardly and upwardly inclined and each side of the enclosure 34 includes a built-in storage area 62 including a hinged top cover 64 whose upper surface has a seat cushion 66 mounted thereon. In addition, each side wall of the enclosure 34 includes a backrest cushion 68 contoured to conform to and overlap the juncture between the lower side wall portions 42' and 44' and the upper portions of the side walls 42 and 44.

The enclosure 36 may have its various wall panels constructed of any suitable material, such as fiber glass and several models of the enclosure of slightly different dimensions may be used to fit substantially all standard pickup truck load beds.

The foregoing is considered as illustrative only for the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with a pickup truck of the type including a load bed provided with opposite side walls inwardly of which the rear wheel wells of the truck project and also a front cab portion disposed forwardly of the load bed, a personnel cab for said load bed comprising an enclosure including upstanding front and rear walls as well as opposite side walls interconnected by means of top and bottom walls, said rear wall having an access opening formed therethrough and said enclosure being removably disposed in the front end portion of said load bed and including rearwardly, outwardly and downwardly opening recess formed in its lower opposite side rear corner portions in which the rear wheel wells of said truck are received.

2. The combination of claim 1 wherein said cab portion includes a rear wall having a window opening formed therethrough, said front wall including a window assembly closely registered with said window opening.

3. The combination of claim 1 wherein said enclosure projects above said load bed side walls, said enclosure side walls including inwardly offset lower portions snugly received between said load bed side walls and the lower extremities of the enclosure side walls above said inwardly offset lower portions resting upon the upper marginal portions of said load bed side walls.

4. The combination of claim 1 wherein said enclosure projects above the top of said cab portion, the upper portion of the front wall of said enclosure projecting above said cab portion being forwardly downwardly inclined.

5. The combination of claim 1 wherein said enclosure includes opposite side generally horizontal and longitudinally extending bench seats projecting inwardly from said enclosure side walls.

6. The combination of claim 5 wherein said enclosure projects above said load bed side walls, said enclosure side walls including inwardly offset lower portions snugly received between said load bed side walls and the lower extremities of the enclosure side walls above said inwardly offset lower portions resting upon the upper marginal portions of said load bed side walls, said enclosure further including side wall mounted backrest cushions projecting upwardly from the outer marginal portions of said bench seats and overlying the juncture between the upper extremities of said inwardly offset lower portions and the lower extremities of the portions of the enclosure side walls disposed thereabove.

7. The combination of claim 6 wherein said cab portion includes a rear wall having a window opening formed therethrough, said front wall including a window assembly closely registered with said window opening.

8. The combination of claim 7 wherein said enclosure projects above the top of said cab portion, the upper portion of the front wall of said enclosure projecting above said cab portion being forwardly and downwardly inclined.

* * * * *